Sept. 7, 1965    A. J. WILLIAMS    3,204,662
VALVE FOR SELECTIVELY INTRODUCING FLUID FROM TWO SOURCES
TO A PLURALITY OF VALVE UNITS
Filed Feb. 26, 1963
Fig. 1.
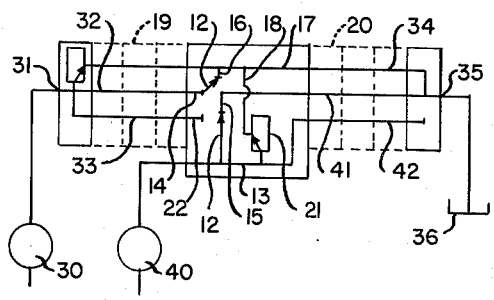
Fig. 3.
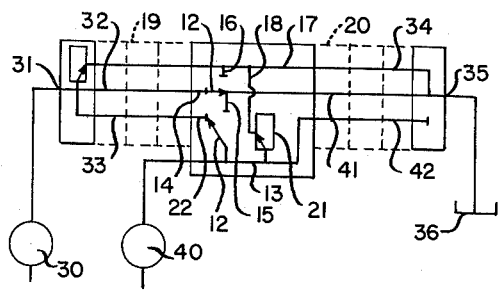
Fig. 2.
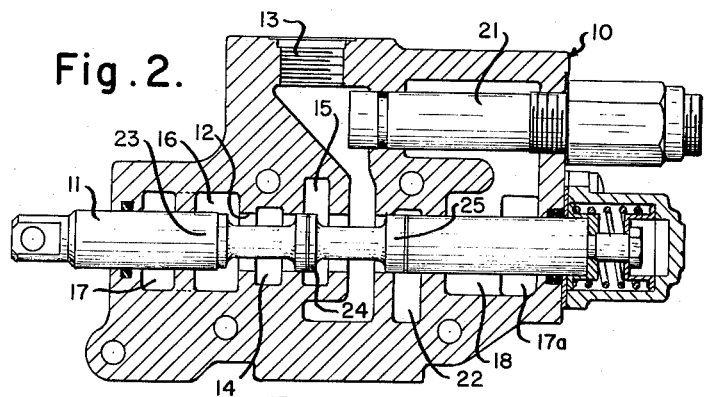
Fig. 4.
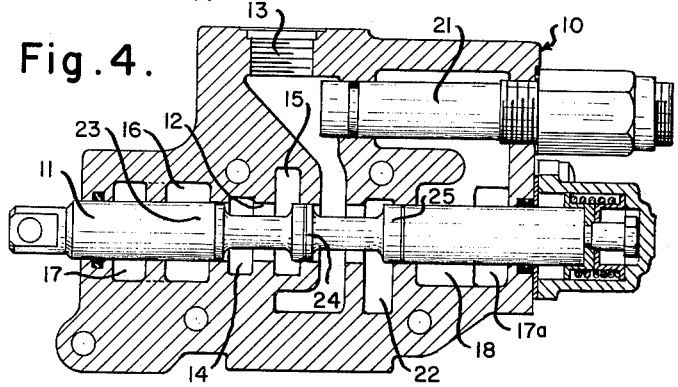
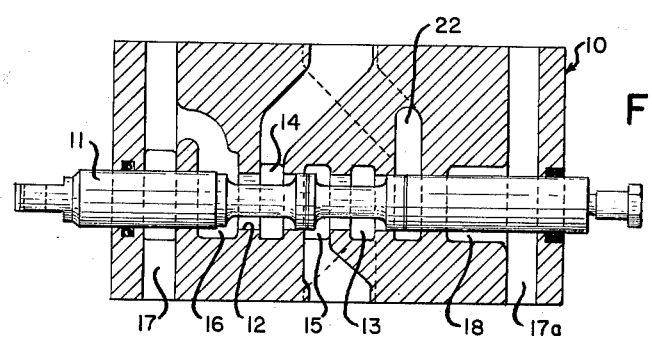
Fig. 5.
INVENTOR
Arthur J. Williams

United States Patent Office 3,204,662
Patented Sept. 7, 1965

3,204,662
VALVE FOR SELECTIVELY INTRODUCING FLUID FROM TWO SOURCES TO A PLURALITY OF VALVE UNITS
Arthur J. Williams, Hubbard, Ohio, assignor to Commercial Shearing & Stamping Company, a corporation of Ohio
Filed Feb. 26, 1963, Ser. No. 261,137
5 Claims. (Cl. 137—596)

The present invention relates to valves and particularly to a selector valve for incorporation into a bank of parallel valves, such as the Commercial Shearing and Stamping Company type A–20 or type A–35 parallel valve, by means of which fluid from two sources may be used in parallel or in series.

There are certain hydraulic applications where a multiplicity of valves are used in parallel for controlling hydraulic cylinders which simultaneously or selectively perform work such as, for example, loading machines, digging machines and like hydraulically operated devices. In many of these applications, it would be desirable to be able to selectively introduce fluid from two sources, each one independently operating a portion of the bank or the two units operating in series over the whole bank of valves. The present invention is directed to a valve which permits such operation.

I preferably provide a valve body having a bore and valve element slidably axially therein, said body having a first inlet passage connectable with a source of fluid under pressure, a second inlet passage adapted to be connected to a second source of fluid under pressure, a low pressure and a high outlet passage, said inlet and outlet passages intersecting the bore at spaced apart points transversely to the axis of the bore, a passage spaced from the bore and parallel to the first inlet passage and connected at all times to said second inlet passage, a second passage intersecting the bore spaced from the parallel passage and connecting the first inlet passage with the bore and adapted to be connected to the second inlet in one position of the valve element whereby the two inlet passages are connected in series and closed against communication with the said second inlet in a second position of the valve member at which position of the valve member the first inlet port is connected to the outlet.

In the foregoing general description I have set out certain advantages, purposes and objects of my invention. Other objects, advantages and purposes will be apparent from a consideration of the following description and the accompanying drawings in which:

FIGURE 1 is a schematic illustration of the valve of my invention inserted in a bank of side-by-side valve sections such as the A–20 valve of Commercial Shearing and Stamping Company;

FIGURE 2 is a vertical section through the bore of a valve according to my invention with the valve element in a position to form the connections shown in FIGURE 1;

FIGURE 3 is a schematic illustration corresponding to FIGURE 1 with the valve shifted to its second position;

FIGURE 4 is a section identical with that of FIGURE 2 with the valve member in the second position; and FIGURE 5 is a horizontal section through the valve of FIGURE 2 on the center line of the bore with spring return means removed.

Referring to the drawings, I have illustrated a valve made up of a valve body 10 having a valve element 11 slidable in a bore 12 in the valve body. The bore 12 is provided with inlet passage 13 adapted to be connected to a source of fluid and to deliver the fluid to the bore 12 in a crosswise intersecting passage. A second inlet passage 14 transversely intersects the bore 12. A high pressure outlet passage 15 intersects the bore adjacent and between the two inlet passages 13 and 14. A low pressure outlet passage 16 intersects the bore on the opposite side of the inlet passage 14 from high pressure outlet 15. This low pressure outlet 16 is connected with the low pressure return line 17 which extends through the valve body and is adapted to be connected to the low pressure return outlets of the next adjacent valves. A second low pressure return outlet line 18 extends through the valve at the opposite end of the valve body and is adapted to be connected with the low pressure return lines 17a in the next adjacent valve bodies 19 and 20. The low pressure return line 18 is connnected to the inlet passage 13 by means of a relief valve 21. A passage 22 intersects the bore 12 between the inlet passage 13 and the low pressure outlet passage 18. The passage 22 is adapted to be connected to the parallel passage 33 of the preceding valve sections 19. The valve element 11 is provided with lands 23, 24 and 25 which function to control the flow of fluid between the passages which intersect the bore so that the fluid is directed as will be hereafter described.

The operation of the valve in a series of parallel circuit sections, such as Commercial A–20 sections, is as follows. Referring specifically to FIGURES 1 and 2, fluid from a high pressure source 30, such as a hydraulic pump, is introduced into the inlet 31 of a conventional grouping of parallel valve sections. The fluid entering the inlet 31 is passed into the open center passages 32 of the parallel type valves and into the parallel passages 33 of the same valve. With the valve in the position shown in FIGURE 2, the fluid enters the inlet 31, passes through the open centers 32 and the parallel passage 33. When the fluid enters the valve of the present invention that fluid which is in the parallel passage 33 is prevented from further movement. The fluid which is in the open center passages 32 enters the passage 14 between the lands 23 and 24, passes through the bore 12 and into the passage 16 from which it moves by means of the passage 16 (see FIGURE 5) to low pressure return passage 17. From the return passage 17, it enters the low pressure return passages 34 of the succeeding parallel valves 20 and is discharged into the outlet 35 and to the tank 36. Hydraulic fluid from a second high pressure source, such as pump 40, is delivered to the inlet passage 13. From the inlet passage 13, fluid flows into passage 15 from bore 12. Passage 15 is connected to the open center passages 41 of the succeeding valve sections 20. At the same time, the fluid is divided and a portion of it enters into the lower parallel section of passage 13 which is connected to the parallel passages 42 of the next succeeding valve sections 20. From passage 41, the fluid is discharged into the outlet 35 and returned to tank 36. It will be apparent from this arrangement that the fluid from pump 30 operates the valve sections 19 which precede the valve of the present invention and the fluid coming from pump 40 operates the valve sections 20 following the valve of this invention.

Referring to FIGURES 3 and 4, the valve element 11 has been moved to the right viewing FIGURE 2, so that it has assumed the new positions of FIGURES 3 and 4. In this position, the high pressure fluid from pump 30 enters the inlet 31 and is divided into the open center passage 32 and parallel passage 33. The high pressure fluid from pump 40 entering the inlet 13 of the valve of this invention passes through the passage 13 into the passage 22 where it is delivered through parallel passage 33 of valve sections 19 into the inlet section 31 and is combined with the fluid passing through the open center passage 32 of the valve sections 19. It enters the valve of this invention through the passage 14 and is delivered through bore 12 into the passage 15 from whence it passes into the open passage 41 of the valve sections 20. Simultaneously, a portion of the fluid entering the passage 13 goes into the parallel passage 22 and is connected to the parallel passages 42 of the succeeding valve sections 20. It is apparent from this that the fluid entering from pumps 30 and 40 is combined in passage 13 so that it passes through the parallel passages 33 and 42 of both the preceding and succeeding valve sections 19 and 20 and down the open center passages 32 and 41 of both the valve sections 19 and 20 so that the two pumps or sources of pressure are, in fact, in series and deliver fluid simultaneously to all of the valve sections.

It will be clear from the foregoing description that the valve of the present invention will be in one position operate to deliver fluid to a series of succeeding valve sections while diverting fluid from all preceding sections to the low pressure outlet. In the other position, the valve of this invention will deliver its input fluid to the input of both the preceding and succeeding valves in combination with the fluid delivered to the preceding valve bank. Thus an operator has a variety of selections of source and operating conditions which, prior to the present invention, were not available to him. This gives hydraulically operated machines a versatility not heretofore available.

While I have illustrated and described a present preferred embodiment of my invention, it will be understood that this invention may be otherwise embodied within the scope of the following claims.

I claim:

1. A valve structure comprising a valve body having a bore and valve element slidable axially therein, said valve having a pair of spaced annular grooves, a first inlet passage connectable with a source of fluid under pressure, a second inlet passage adapted to be connected to a second source of fluid under pressure, a low pressure outlet and a high pressure outlet passage, said inlet and outlet passages intersecting the bore at spaced apart points transversely to the axis thereof, a passage spaced from the bore and parallel to the first inlet passage and connected at all times to said second inlet passage, a second passage intersecting the bore spaced from the parallel passage and adapted to connect the first inlet passage with the second inlet passage through one of said pair of grooves in said valve element whereby the first inlet is connected to the second inlet in a first position of the valve element to deliver fluid to the high pressure outlet and to connect the first inlet passage to the high pressure outlet passage through said one groove in said valve element and the second inlet is connected to the low pressure through the other of said pair of grooves when the valve element is in a second position outlet passage.

2. A valve structure comprising a valve body having a bore and valve element slidable axially therein, said valve element having a pair of spaced grooves, a first inlet passage connectable with a source of fluid under pressure, a second inlet passage adapted to be connected to a second source of fluid under pressure, a low pressure outlet and a high pressure outlet passage, said inlet and outlet passages intersecting the bore at spaced apart points transversely to the axis thereof, a relief valve means connecting the first inlet passage to the low pressure outlet whereby excess fluid entering the inlet may be discharged to the low pressure outlet, a passage spaced from the bore and parallel to the first inlet passage and connected at all times to said second inlet passage, a second passage intersecting the bore spaced from the parallel passage and adapted to connect the first inlet passage with the second inlet passage through one of said pair of grooves in said valve element whereby the first inlet is connected to the second inlet in a first position of the valve element to deliver fluid to the high pressure outlet and to connect the first inlet passage to the high pressure outlet passage through said one groove and the second inlet is connected to the low pressure outlet passage through the other of said pair of grooves when the valve element is in a second position.

3. A valve structure comprising a valve body having a bore and valve element slidable axially therein, a pair of spaced grooves in said valve element, a first inlet passage connectable with a source of fluid under pressure, a second inlet passage adapted to be connected to a second source of fluid under pressure, a pair of low pressure outlet passages and a high pressure outlet passage, said low pressure outlet passages intersecting the bore at spaced apart points on the extremities of the bore transversely to the axis thereof, said inlet passages intersecting the bore intermediate the outlet passages and adjacent thereto, said high pressure outlet passage intersecting the bore intermediate the inlet passages, a first parallel passage spaced from the bore and parallel to the high pressure outlet passage and connected at all times to said second inlet passage, a second parallel passage intersecting the bore between the second inlet passage and the adjacent low pressure outlet passage and adapted to connect the first inlet passage with the second inlet passage through one of said pair of grooves in said valve element whereby the first inlet is connected to the second inlet in a first position of the valve element to deliver fluid to the high pressure outlet and to connect the first inlet passage to the high pressure outlet passage through said one groove in said valve element and the second inlet is connected to the low pressure outlet passage through the other of said pair of grooves when the valve element is in a second position.

4. A valve structure as claimed in claim 3 wherein the first and second parallel passages discharged from the valve body on a line beneath the bore and generally parallel to the first inlet passage.

5. A valve structure comprising a valve body having a plurality of spaced parallel bores, a valve element slidable axially in each bore, an intermediate valve element of said elements having a pair of spaced annular grooves, an intermediate bore of said parallel bores carrying said intermediate valve element having a first inlet passage connectable by means of an elongated through passage intersecting the preceding bores with a source of fluid under pressure, a second inlet passage adapted to be connected to a second source of fluid under pressure, a pair of low pressure outlet passages and a high pressure outlet passage, said low pressure outlet passages intersecting said intermediate bore at spaced apart points on the extremities of said intermediate bore transversely to the axis thereof, said low pressure outlets connecting with elongated through passages intersecting all of the plurality of bores, said inlet passages intersecting the said intermediate bore intermediate the outlet passages and adjacent thereto, said high pressure passage being connected through an elongated through passage intersecting the succeeding bores with outlet means and intersecting the said intermediate bore intermediate the first and second inlet passages, a first parallel passage parallel to the elongated through passage spaced from the intermediate bore and parallel to the high pressure outlet passage and connected at all times to said second inlet passage and to an elongated passage extending beneath the succeeding bores, a second parallel passage intersecting the said intermediate bore spaced from the parallel passage and adapted to connect the first inlet passage with the second inlet passage through one of said pair of grooves in said valve element, an elongated through passage extending beneath the preceding bores and adapted to be connected to the second inlet passage through the preceding bores whereby the first inlet is connected to the second inlet in a first position of the valve element to deliver fluid to the high pressure outlet and to connect the first inlet passage to the high pressure outlet passage through said one groove and the second inlet is connected to the low pressure outlet passage through the other of said pair of grooves when the valve element is in a second position.

References Cited by the Examiner

UNITED STATES PATENTS 2,800,798 7/57 Korsmo _____ 137—625.4

FOREIGN PATENTS 941,041 3/56 Germany.

M. CARY NELSON, *Primary Examiner.*
MARTIN P. SCHWADRON, *Examiner.*

UNITED STATES PATENT OFFICE
CERTIFICATE OF CORRECTION

Patent No. 3,204,662                                September 7, 1965

Arthur J. Williams

It is hereby certified that error appears in the above numbered patent requiring correction and that the said Letters Patent should read as corrected below.

Column 3, line 62, before "through" insert -- outlet passage --; line 63, strike out "outlet passage"; column 4, line 44, for "discharged" read -- discharge --; line 53, after "through passage" insert -- 32 --; same column 4, line 55, after "passage" insert -- 13 --.

Signed and sealed this 22nd day of March 1966.

(SEAL)
Attest:

ERNEST W. SWIDER                                EDWARD J. BRENNER
Attesting Officer                                      Commissioner of Patents